Aug. 13, 1968     B. A. LAMBERTON     3,396,545

METHOD OF FORMING CONCRETE BODIES

Filed April 7, 1965     4 Sheets-Sheet 1

INVENTOR.
BRUCE A. LAMBERTON

BY    *Tilberry & Body*

ATTORNEYS

Aug. 13, 1968

B. A. LAMBERTON 3,396,545

METHOD OF FORMING CONCRETE BODIES

Filed April 7, 1965

INVENTOR.
BRUCE A. LAMBERTON

BY *Tilberry & Body*

ATTORNEYS

Aug. 13, 1968 B. A. LAMBERTON 3,396,545
METHOD OF FORMING CONCRETE BODIES

Filed April 7, 1965 4 Sheets-Sheet 3

INVENTOR.
BRUCE A. LAMBERTON
BY
Tilberry & Body
ATTORNEYS

Aug. 13, 1968 B. A. LAMBERTON 3,396,545
METHOD OF FORMING CONCRETE BODIES
Filed April 7, 1965 4 Sheets-Sheet 4

INVENTOR.
BRUCE A. LAMBERTON
BY
Tilberry & Body
ATTORNEYS

United States Patent Office 3,396,545
Patented Aug. 13, 1968

3,396,545
METHOD OF FORMING CONCRETE BODIES
Bruce Alexander Lamberton, Berea, Ohio, assignor to Construction Techniques, Inc., Cleveland, Ohio, a corporation of Delaware
Filed Apr. 7, 1965, Ser. No. 446,346
22 Claims. (Cl. 61—47)

ABSTRACT OF THE DISCLOSURE

A method of forming concrete bodies wherein a porous fabric form is provided and a cementitious grout having a water cement ratio in excess of 0.45 is pumped into the form until the form is inflated. The pumping is continued until enough of the water of the grout has been expressed outwardly through the pores of the form that the water cement ratio is reduced to around 0.30 and the grout is no longer flowable and has set up. This set up grout is now allowed to harden into a concrete body.

---

This invention pertains to the art of forming bodies of concrete and more particularly to a method and apparatus for forming such bodies by pumping a cementitious slurry or grout into the space where such body is desired.

The invention is particularly applicable to the forming of cylindrical, axially elongated bodies of hardened concrete, e.g., bridge piers, caissons, shaft linings or tanks and will be described with particular reference thereto although it will be appreciated that the invention has no other and broader applications.

In the art of building concrete bodies of the type to which this invention pertains, namely, where at least part of the surface or surfaces of the final concrete body will have to be self supporting, it has always been considered necessary to first construct a rigid form of wood or steel or the like defining a space having the shape of the desired body and then to fill this space with a water slurry of cement. When the cement hardens, the form can be removed.

In all instances the cost of materials and the cost of constructing this rigid form has added an undue expense to the cost of building concrete structures. While the cost of the form can be reduced by constructing it in a manner that it can be reused, still the labor of assembling and disassembling the form is substantial and even so, the forms have a relatively short life.

Thus, in the building of bridge piers, it has heretofore been conventional to construct a coffer dam in the water at the end point of use or to construct a coffer dam on dry land and then float it to the desired location of the pier where it is sunk into the desired position. In addition to the problems above mentioned, the difficulty of building coffer dams or of sinking them in the desired position, particularly during rough weather, is extremely difficult.

In the art of lining shafts or tunnels under the earth's surface, the construction of the wooden or metallic forms in an often very confining space preparatory to pouring the cement has always been difficult and expensive. Also, the construction of the forms often interferes with the digging of the shaft so that it is necessary to halt the digging while the forms are being put into position.

Furthermore, using methods known heretofore, it has been practically impossible to form concrete cylinders, e.g., tunnel linings or tanks and then to prestress such cylinders into a state of compression so that the cylinder can better withstand internal pressures.

The present invention contemplates the use of a form and a method of use of same which overcomes all of the above-referred to objections and others and enables bodies or structures to be readily formed, either on or under the earth's surface with a minimum of expense, and a maximum ease and speed of placement.

"Earth's surface" as used hereinafter, includes not only the flat surface of the earth itself, but also the surface of any body of water, whether salt or fresh, or in the case of an overhang, may be the lower surface of such overhang.

"Shaft" as used hereinafter is any passage or tunnel above or below the earth's surface whether vertical, horizontal, at an angle, straight or curved.

"Vertical" will be used hereinafter for the purposes of convenience and simplicity but may be taken as any direction including horizontal or at an angle to the horizontal or to the actual vertical.

"Slurry" as used hereinafter means any liquid suspension of solid particles of a size varying from one micron and larger capable of being pumped through pipes or conduits for distances of from one to any number of feet required for a particular operation to be carried out. The slurry may also include various substances for lubricating the particles so that they will slide more easily one over the other or for assisting in maintaining these particles in suspension. The slurry may also contain particles larger than those above referred to, but these will normally be referred to as an aggregate.

Some of the particles may be of a cementitious type, such as portland cement, which will react either with other particles or with the liquid vehicle or both to form a solid. Such a slurry will be referred to as a cementitious slurry or a grout. The grout, when it hardens, will be called hardened cement or concrete. Concrete generically includes hardened cement whether or not it contains an aggregate.

Water-cement ratio is the ratio of the weights of the water and all cements used in the slurry. Pozzolans are normally considered equivalents to or substitutes for cement and when employed in the slurry are considered a cement in calculating the water cement ratio. Sand or aggregate may then be added to the mix in amounts that will be suspended therein but this does not alter the water cement ratio.

Liquid or water permeable or filter-like means a material having openings or pores therethrough large enough to at least pass the liquid of the slurry when under pressure but small enough to prevent the passage of essentially all of the particles. It will be appreciated that a pore opening may be larger than an individual particle and still prevent passage of such particles. In such instances, two or more particles, attempting to pass through the opening or pore at the same time bridge the opening effectively plugging it. In general, the pore or opening size should be between 1.0 and 1.5 times the maximum particle size.

Setting up as applied to a cementitious slurry or grout means where water cement ratio has either been reduced sufficiently or the cement has hydrated sufficiently or both that the mixture has completely lost any flow characteristics but has little physical strength. The strength is obtained by the ultimate hydration of the cement particles. Setting up may take place in as little as ten minutes, particularly when the water-cement ratio is reduced as with the present invention, while hydration may take days or weeks to go to completion. A grout which has set up and then completed at least a substantial part of its hydration will be referred to as "hardened."

The present invention attempts to make beneficial use of a phenomenon which has long plagued the field of pressure grouting, namely, that when it is attempted to fill cracks and voids below the earth's surface with concrete by using pressure to force a cementitious slurry through the cracks and into the voids, the particles in the slurry block up the cracks even though of a width larger than the largest particle size in the slurry and prevent the further movement of the particles through the cracks into the remote voids. Apparently two or more of the particles in attempting to go through a crack at the same time bridge the crack thus restricting its opening. Thereafter, smaller particles bridge this restricted opening in the same manner until very quickly even the cement particles having a size on the order of 10 microns will not pass through the openings. In effect, the various particles in the grout form a "filter bed" to prevent the passage of any particles of any size. This filter bed effect can take place quite rapidly and once it starts nothing can prevent its continuing. If the pressure is maintained, however, water will still pass through such filter bed carrying with it an insignificant amount of the cement particles such that the cement particles upon hydration have no or an insignificant strength and no stabilizing effect on the surrounding soil. Heretofore the passage of the water into the voids beyond the filter bed without also carrying sufficient cement particles to improve soil characteristics was considered quite detrimental.

The present invention uses this "filter bed" phenomenon to good advantage. Thus, it is known that the higher the water to cement ratio employed, the easier it is to pump the grout particularly over long distances.

It is further known that a water-cement ratio below about .35 sets up very rapidly.

It is also known that for most portland cements the final water to cement ratio should not be less than 0.25, which is the minimum required for complete hydration of the cement.

In accordance with the broadest aspect of the present invention a method of forming concrete bodies is provided including the steps of providing an easy to pump slurry having a water to cement ratio in excess of 0.45, e.g. up to 0.65, or even more with type III portland cement, then pumping such slurry into a form having at least a part of its surface provided with openings small enough that a "filter bed" will form at that part of the surface. As the filter bed forms, the pressure rises forcing the water to flow through the filter bed and out of the form while the cement particles remain behind resulting in a reduction in the water to cement ratio to a quick setting but fully hardenable range of from 0.25 to 0.40. It is, of course, true that before the filter bed is completely formed some of the cement particles will have also passed through the porous surface of the form but tests have indicated that only one or two percent of such cement particles do so and thereafter the water coming through is clear or almost clear. This water dilutes and washes off any of the particles that might have initially come through.

In order to force the water through the filter bed and out of the form, it is usually necessary in accordance with the invention that substantial ultimate pressures on the order of 35 to 100 p.s.i. be employed. These pressures of course exert an outward force on the walls of the form and in preferred embodiments of the invention, the form is made from a flexible porous fabric which inflates under such pressures. These pressures create tension forces in the walls of the form which can possibly exceed the bursting strength of many fabrics. It is therefore necessary that in all instances a fabric or reinforcements for the fabric making up the form be provided which, taking into consideration the dimensions of the form and the pressures to be employed, will withstand the resultant tension forces. Of course, as the dimensions of the form are increased, the forces developed on the walls of the form by a given pressure likewise increase. For the type and size of structures which the present invention contemplates, vegetable and animal fibers such as cotton or wool generally do not have sufficient strength and in all instances, it is preferred to employ the synthetic high strength fibers such as nylon, fiberglass or the like and these fabrics should be woven into a sheet or tube of a thread count and/or strand size to give the desired porosity and strength.

The synthetics have further desirable characteristics over the natural fibers, namely, they are not wetted by the water of the slurry and do not swell up to block the openings between strands. As such they retain their strength and also aid in the formation of the filter bed. Further, nylon and similar materials have an inherent elasticity which is beneficially used to maintain the pressure on the slurry after the pumping has stopped. Also under the tension forces, the individual strands can slip relative to one another to align themselves into a mesh fabric with uniform size openings or pores. In this respect, it is to be noted that the present invention employs a fabric having a pore size such that the grout does more than simply ooze through the pores, but actually flows readily therethrough until such time as the heretofore undesirable filter bed has had a chance to form and prevent further passage of the cement particles while still allowing the water in the slurry to pass outwardly.

The pressures employed in the grouting must also take into consideration the pressure required to force the water in the slurry outwardly through this filter bed in a time period less than that required for the cement to set up. This time period is in turn affected by the setting time of the cement employed and whether or not retarders or accelerators have been employed in the slurry. However, in all instances it is believed necessary to maintain the material in the form under pressure, particularly if the form is flexible, until such time as the cement has at least commenced to set up, otherwise when the pressure is removed, the flexible form will sag and will lose its inflated shape. Also, tests have shown that cement which has set up under pressure in accordance with the invention has a higher density and a much higher four or seven day strength than the same cement which has set up not under pressure. The invention contemplates maintaining a pressure of from 25–75 pounds per square inch until such time as the cement has at least commenced to set up.

As heretofore indicated, the form may be constructed so as to take any one of a number of different shapes when inflated by the grout under pressure. When a fabric of woven material is used for the entire form, then normally a shape must be employed which has a maximum bursting strength for a given type of material.

In accordance with another aspect of the present invention, a method of forming concrete bodies is provided comprising providing a form approximating the desired ultimate shape of the concrete body, such form having at least a portion of its surface formed of a liquid permeable material, positioning such form generally in the final desired position of the concrete body and then pumping a slurry into such form until a filter bed forms adjacent the liquid permeable portion and a pressure builds up and maintaining such pressure until at least 10% of the liquid of the slurry has passed through the liquid permeable surface leaving the particles of the slurry behind on the inside of the form.

In the event a cementitious slurry is employed, then the pressure is maintained until the cement has commenced to set up.

In accordance with another aspect of the present invention, a form for casting or molding cement is provided comprised of loosely woven, high strength, synthetic material generally in the shape of the desired cement body, e.g., of a toroid or a segment thereof. A toroid, of course, is a body or surface of revolution formed by a circle or other geometric shape rotated about a remote axis of revolution.

Further in accordance with the invention, a method of forming cylindrical concrete shapes is provided comprised of providing a form from a flexible porous fabric generally in the shape of at least a part of a toroid, placing such form at the desired location of the shape, pumping a cementitious slurry into such form at a substantial pressure sufficient to inflate the form and cause a flow of the water of the slurry through the fabric until the particles of the slurry form a filter bed against the inside surfaces of the form, continuing the pressure on such form until at least 10% of the water of such slurry has passed through pores of the form and until the cement has at least commenced to harden or set up, and repeating such operations with additional adjacent toroids and cementitious slurry.

Further in accordance with the invention, a method of lining either vertical or horizontal shafts in the earth is provided comprising the steps of forming a generally cylindrical passage in the earth's surface and either after the entire passage has been formed or progressively as the passage is being formed, positioning a form of flexible porous material generally in the shape of a toroid in such passage with the axis of the toroid generally parallel to the axis of the shaft; and, pumping a cementitious slurry into such form under pressure to expand the collapsed form into pressure contact with the walls of the shaft and maintaining such pressure until at least 10% of the liquid of the slurry has passed through the pores of the material and until the cement has at least commenced to harden or set up. Usually the external diameter of the toroid is at least as great as the internal diameter of the shaft. In the event the diameter is less the resultant space may be grouted by conventional processes.

Further in accordance with the invention, a method of prestressing a concrete cylindrical body prestressed into a state of compression is provided comprising providing a closed form of flexible, liquid permeable material having a shape when inflated generally in the shape of a toroid with an inner diameter less than the outer diameter of the member, inflating said form by pumping into it a cementitious slurry under pressure so that said slurry inside of said form exerts a radially inward pressure on the member, maintaining such pressure until at least 10% of the liquid has passed through the liquid permeable surfaces and further maintaining such pressure until the cement particles have at least commenced to harden or set up. The inner member may of course be a concrete cylinder manufactured by conventional methods or by a plurality of side by side toroids manufactured in accordance with the present invention.

One of the problems presented by the present invention was to obtain a porous fabric bag having a seam or seams which can withstand the extremely high circumferential tension forces developed when the bag is inflated to substantial pressures, e.g., 50 or 100 pounds per square inch. This problem was presented to a number of manufacturers of nylon cloth, which is the fabric preferred for use in accordance with the present invention, together with a description of the circumferential tension forces to be encountered. In each instance they all presented a stitched type of seam which upon experimentation, rapidly failed at a pressure far below that at which calculations have shown the nylon fabric should be able to withstand.

The present invention contemplates a bag made from high tensile strength nylon fabric which overcomes these difficulties and provides seams which are at least as strong as the fabric itself.

In accordance with this aspect of the invention, a sheet of high tensile strength fabric is formed into a tube or bag so that the edges are overlapping with the inner surface of one edge facing the outer surface of the other edge and these overlapping edges are held together with a flexible cement having high shear strength characteristics. The shear strength characteristics may be distinguished from tensile strength characteristics. Stitched seams known to applicant, wherein the inner surface of one edge faces the inner surface of the other edge or the outer surface of one edge faces the outer surface of the other edge, do not have the requisite strength. The edges of the fabric may be hemmed by stitching before bringing them into overlapping relationship without departing from the invention.

The principal object of the invention is the provision of a new and improved form for use in the manufacture of concrete bodies and a method of use thereof which enables the manufacture of concrete bodies of maximum strengths with a minimum cost.

Another object of the invention is the provision of a new and improved form for use in the manufacture of concrete bodies which is generally in the shape of a toroid having at least a portion of its surface liquid-permeable.

Another object of the invention is the provision of a new and improved method of forming concrete bodies which consists in pumping a cementitious slurry into a form having at least a portion of its surface liquid-permeable, continuing the pumping until a pressure builds up and at least 10% of the liquid has passed through the liquid-permeable surfaces and maintaining the pressure until the cement has commenced to set up.

Another object of the invention is the provision of a new and improved method for lining shafts which is simple and easy to use and avoids the necessity of constructing rigid forms on the inside of the shaft for receiving concrete, and enables the lining to be installed without interrupting the shaft digging operation.

Another object of the invention is the provision of a new and improved arrangement for manufacturing cylindrical vessels wherein the inner surface is in a prestressed state of compression so as to be better able to withstand internal vessel pressures.

Another object of the invention is a new and improved method for providing concrete bodies in the water which does not require the transporting of the hardened concrete bodies from the place of manufacture to the end point of use.

Another object of the invention is the provision of a new and improved arrangement for manufacturing hollow cylindrical bodies above and below the earth's surface which uses a cheap form and which does not require expensive prefabricated rigid forms.

Still another object of the invention is the provision of a new and improved method for forming concrete bodies at points remote from the mixing point of the cement which enables the use of high water-cement ratios for easy pumpability while at the same time providing concrete having strength characteristics of the ideal water-cement ratios for maximum strength.

Still another object of the invention is the provision of a new and improved method for forming concrete bodies in situ wherein the cement sets up much more rapidly than ever heretofore thought possible.

Another object of the invention is the provision of a new and improved flexible, porous form of woven nylon or like material wherein the seams have a strength approaching that of or exceeding the strength of the nylon fabric and can thus withstand large inflation pressures on the inside of the form.

Another object of the invention is the provision of a new and improved form for use in manufacturing concrete bodies, such form being in the shape of an elongated tube of high strength fabric material adapted to be shaped into a toroid and inflated with a cementitious slurry.

Still a further object of the invention is the provision of a new and improved form for use in forming concrete bodies which consists of woven porous material in the shape of a toroid.

A further object of the invention is the provision of a new and improved arrangement for manufacturing compensating for the inclination of a surface on which a cylindrical body of concrete is to be constructed having a vertical axis.

Another object of the invention is the provision of a new and improved arrangement for horizontally interlocking a plurality of vertically stacked cylindrical bodies of concrete.

The invention may take physical form in certain parts and combinations of parts and certain steps and combination of steps, preferred embodiments of which will be described in detail in this specification and where possible, illustrated in the accompanying drawings which form a part hereof and wherein.

Figure 1:
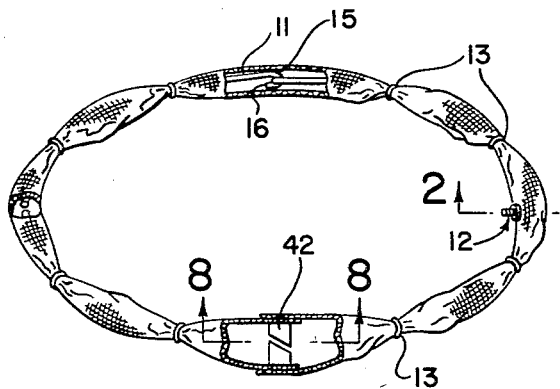
FIGURE 1 is a perspective view with portions broken away to show the interior of a collapsed form illustrating a preferred embodiment of the present invention.
Figure 2:
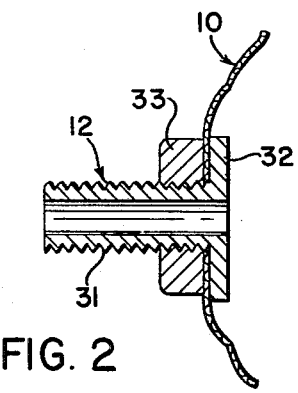
FIGURE 2 is a fragmentary cross-sectional view taken approximately on the line 2—2 of FIGURE 1 and showing details of a fitting for feeding a slurry into the interior of the form of FIGURE 1.

Referring now to the drawings wherein the showings are for the purposes of illustrating preferred embodiments of the invention only, and not for the purposes of limiting same, FIGURE 1 shows a collapsed hollow or tubular flexible form 10 generally in the shape of a ring or toroid and having on the inside thereof a tensile reinforcing ring member 11 and at one point on the circumference a filler pipe 12. The form 10 is shown as collapsed and a plurality of ties 13 of a frangible material such as light string or masking tape are located at spaced points around the ring to hold the fabric in the collapsed condition.

While only one tensile member 11 is shown, it will be appreciated that any number of tensile members may be placed on the inside of the form 10. The ends of the tensile members may be joined in any desired fashion but in the embodiment shown, the two ends 15, 16 are bent over through an arc of 180° in planes at right angles to each other and are hooked together generally as shown. Obviously the ends 15, 16 may be bolted, welded or otherwise fastened. These tensile members 11 may in many instances be omitted, particularly where the forces on the hardened concrete will be such as to place the toroid in compression.

The form 10 is shown in FIGURE 1 as collapsed. Such form in use is intended to be inflated into the shape of a toroid by the pumping of a slurry under pressure thereinto as partly shown in FIGURE 5.

The material from which the form 10 is manufactured may be any one of a number of different materials having a sufficient porosity to readily pass water, but having the size of the pores at least not greater than one and one-half times the maximum particle size to be used in the slurry which will ultimately be pumped into the form 10 through the inlet 12.

Thus, the walls of the form 10 can be manufactured from a solid sheet of flexible material such as rubber or plastic having a plurality of passages therethrough of the size just above referred to. Preferably, however, the form 10 is of a loosely woven, high-strength fabric.

The strands of the fabric may be made from any desired material having the requisite strength to withstand the hydraulic pressures ultimately to be used to inflate the form. Obviously, the forces developed will depend upon the diameter of the cross section of the inflated form as well as the hydraulic pressure to be employed. Normally, animal and vegetable fibers do not have adequate strength. Additionally, they are readily wetted by the water of the slurries to be used. Accordingly, the synthetic fibers such as nylon, Orlon or other materials are preferred. These materials not only have the characteristic of not being wetted by water, but they have the characteristic of having substantial elasticity and an ability of one strand to slip relative to its cross strands of the weave so that when the strands are placed under tension by the hydraulic pressure, they will slip and form a regular weave and additionally will elongate sufficiently as to distribute the tension equally through all of the strands in the weave.

A nylon fabric is preferred having the following characteristics:

23 x 21 thread count, 840 denier, single ply, plain weave. Such a fabric has rather large pore openings of approximately $\frac{1}{32}$ inch and tensile strengths of 393 x 321 pounds per square inch respectively.

Figure 3:
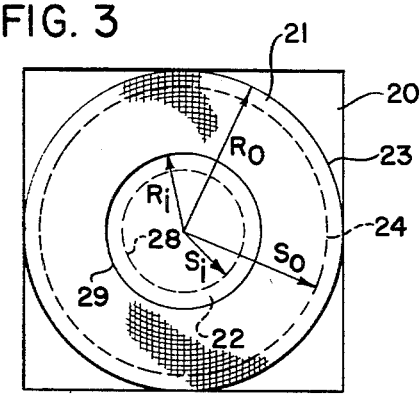
FIGURE 3 is a top elevational view of a sheet of fabric from which the form of FIGURE 1 can be manufactured showing the cutting lines on the sheet.
Figure 4:
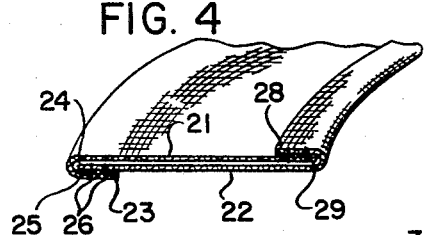
FIGURE 4 is a fragmentary cross-sectional view of a form manufactured from the sheet of FIGURE 3 before inflation thereof.
Figure 5:
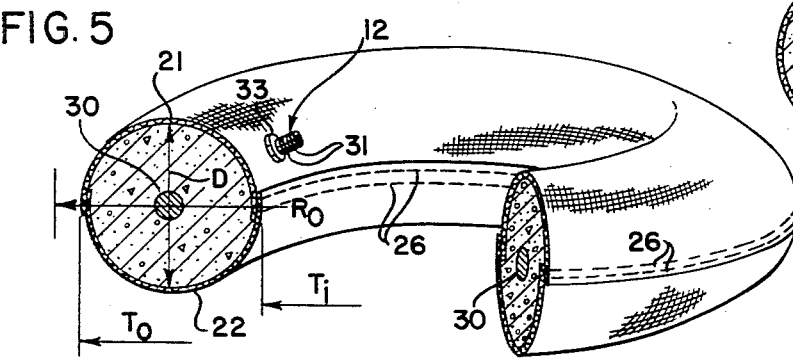
FIGURE 5 is a fragmentary and cross-sectional view of the form of FIGURE 4 inflated with cement.

The form 10 may be manufactured from fabrics in any one of a number of different ways. FIGURES 3, 4 and 5 show one way. Thus, in FIGURE 3 a plurality of squares of fabric 20 provide the starting point. From one square 20 a washer 21 is cut having an outer radius $R_o$ and an inner radius $R_i$. A second washer 22, indicated by the dotted lines, is cut having an outer radius $S_o$ and an inner radius $S_i$. The two washers 21 and 22 are laid one on top of the other with their centers corresponding. The opposed or facing surfaces of these washers are the inner surfaces. The outer edge 23 of the washer 21 is then folded over the outer edge 24 of the washer 22 so that the inner surface of edge 23 faces the outer surface of edge 24. These opposed surfaces are cemented as shown at 25. If desired, stitching can be used to hold the cemented overlapping edges 24, 25 together until the cement hardens. In the same manner, the inner edge 28 of the washer 22 is folded outwardly over the inner edge 29 of the washer 21 so that the inner surface of edge 28 faces the outer surface of edge 29. These opposed surfaces are then cemented. It is to be noted that the radius $R_o$ must be greater than the desired outer radius of the inflated form 10 by an amount equal to both the amount that the outer edge 23 is folded back on the washer 22 and further by an amount equal to the amount that the outer folded edge 25 will be drawn inwardly when the form is inflated to a toroid shape.

It is to be noted that in accordance with the invention the inner surface of one washer edge overlaps and faces the outer surface of the other washer edge. With this arrangement tension forces in the fabric result in shear stresses in the cement. The strength of a seam in shear is a function of the width of the cemented overlap. This seam is to be distinguished from a so-called lock or hook seam where the inner surfaces of one washer edge face the inner surface of the other washer edge or vice versa, or where the inner (or outer) surfaces are facing each other. Here the cement is in tension, localized at the bend in the fabric.

The cement employed should have plasticizers therein so that it remains flexible. The width of overlap will depend on the shear strength of the cement rather than its tensile strength.

For an 8 inch diameter tube, or toroid, and at 50 pounds per square inch pressure, a cemented overlap of ¼ inch using a plasticized epoxy resin cement provides adequate strength.

In accordance with the preferred embodiment of the invention, a cementitious slurry is employed having the following general range of ingredients:

Portland cement: 2 cubic feet or 188 pounds,
Pozzolans in the form of fly ash: one cubic foot or 75 pounds,
Sand: three cubic feet or 330 pounds,
Water: 15 gallons or 118 pounds,
Intrusion-Aid: manufactured by Concrete Chemicals Co: one sack or 2⅝ pounds.

It will be appreciated that in the trade pozzolans are considered as cementing materials and if pozzolans are omitted, then an equivalent amount of Portland cement should be added. It is known that it is possible to substitute from 15–50% of pozzolans for the Portland cement without adversely affecting the qualities of the hardened cement.

The Intrusion-Aid contains small amounts of an aluminum powder which react with the cement as it hardens to produce minute quantities of gas which result in an expansion action to counteract the normal contracting action of the Portland cement as it hardens. The Intrusion-Aid also contains other ingredients for assisting in maintaining the flow characteristics of the slurry as it is pumped over long distances and also for helping to maintain the particles in suspension.

Such a slurry as above described has a water-cement ratio based on weight of approximately 0.45. Such a slurry in the absence of accelerators will normally require approximately 24 hours to set up.

As will appear, more water, i.e., a higher water-cement ratio may be employed because using the invention this excess water is bled off through the walls of the form leaving a much lower and quicker setting water-cement ratio.

In practice, when a cementitious slurry is pumped into the collapsed form shown in FIGURE 1, it first inflates into the shape of a toroid having an outer radius $T_o$ (see FIGURE 5) and an inner radius $T_i$ and a cross-sectional or minor diameter D, all generally corresponding to the dimensions of the washers 21, 22 as cut and assembled as shown in FIGURE 4. Inasmuch as the fabric is relatively flexible, it does not require much, if any, pressure to bring about this inflation. As soon as the form is inflated, and the pumping of the cementitious slurry is continued, a slight amount of the slurry passes outwardly through the pores of the form. However, the particles in the slurry soon block up the pores of the form forming a filter bed as above described. In a very short time, only clear or almost clear water passes outwardly through this filter bed and through the pores of the form.

This clear water washes away any particles which may have earlier come through. The surface of the form is wet but "clean" of any particles of the slurry. The pumping of the slurry is continued until a previously calculated (or previously determined by experiment) pressure is reached, at which time the pressure is maintained.

As the water flows outwardly, the water-cement ratio is very quickly reduced dependent upon the pressures employed. It has been found that a pressure of between 25 to 100 pounds per square inch will reduce the water-cement ratio to somewhere between 0.30 to 0.40 in approximately 3–5 minutes and at this ratio the grout (now almost "dry") very quickly sets up in a matter of 5–10 minutes additional. As soon as this setting up has taken place, the pressure may be removed. The material while not having any appreciable strength, will no longer plastically deform and the hydration of the cement can then take place so that the cement will ultimately harden. During the hardening, the nylon strands which were stretched by the pressure on the grout continue to exert an inward pressure on the hardening cement resulting in a concrete of improved characteristics. The form may be allowed to remain in place or removed as desired. As nylon does not rot or deteriorate with time, the form will protect the surface of the cement for a long time thus preventing spalling and other problems characteristic of cement.

A four-seven day cube strength of 10,125 and 11,125 p.s.i. have been obtained as compared 4400 p.s.i. four day strength for the same cementitious slurry poured into a conventional form.

Pressures on the grout should not be employed such that the water-cement ratio goes below 0.25 because this is the minimum amount of water required to produce total hydration of the cement.

Ordinarily, it has been found that the form immediately after the cement has set up contains a small core 30 of a liquid slurry which has a water-cement ratio higher than that in the filter bed radially outwardly from this core 30.

The grout may be pumped into the form 10 in a number of different ways, e.g., filter pipe 12 which has means, such as threads 31, on its outer end to provide a disconnect to a grout hose or pipe and means on its inner end, such as flange 32, to prevent it from being expelled by the pressures developed on the inside of the form 10.

A nut 33 prevents accidental displacement of the pipe into the collapsed form during handling. The opening through which the tube passes may be formed by cutting a hole in the fabric, but preferably the strands of the fabric are forced aside to permit passage of the tube so that there are no discontinuities and the wall will not be weakened.

Alternately grout may be pumped into the form by making the discharge end of a grout pipe as a smooth probe and then inserting it through the wall of the form 10 at any desired location before the form is inflated by simply pushing the strands of the fabric aside to make room for this discharge end of the grout pipe. As the pressure on the inside of the form builds up, it will be necessary to exert a longitudinal force on the grout pipe to hold it in position equal to the area of the grout pipe multiplied by the grouting pressure being employed. Thus, for a one inch diameter grout pipe and a maximum grouting pressure of 50 pounds per square inch, the force required to prevent the grout pipe from being pushed out of the form is only 39 pounds. Leakage between the outer surface of the grout pipe and the fabric is not a problem because of the filter bed action. Obviously this force can be made self-balancing by providing a single straight rigid pipe having a grout inlet feed connection at the center and grout discharge nozzles at both ends, the length of this pipe being less than the major outer toroid diameter but greater than the major inner toroid diameter. In this manner, filling of the toroid would take place at two diametrically opposite places. The forces tending to push the nozzles out of the toroid would be equal and opposite and would be self-balancing. Alternatively, the grout can be fed into the inside of the form through three or more points simultaneously, either by using a plurality of discharge nozzles extending from a common central feed point or by using a cylindrical header pipe having an outer diameter slightly less than the major inner diameter of the toroid with the header being supplied with a number of equally spaced outwardly radially extending nozzles which extend into and through the inner walls of the form.

Figure 6:
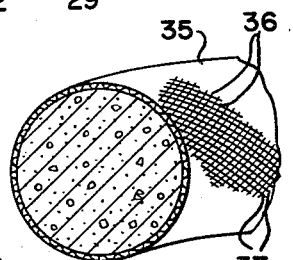
FIGURE 6 is a view similar to FIGURE 5 but showing an alternative mode of construction of the form.

FIGURE 6 shows an alternative mode of constructing the form. Here the form is comprised of a seamless tube 35 manufactured on a continuous tube weaving machine so that the strands 36, 37 extend helically around the tube with a right and left hand helix respectively. With such a tube it is necessary that the ends be joined in a manner such that the ends will not pull apart under the hydraulic pressures employed.

Figure 8:
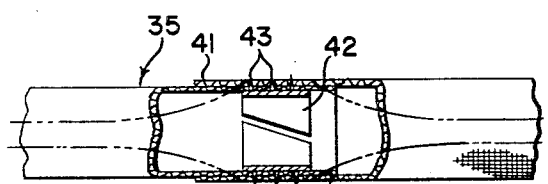
FIGURE 8 is a fragmentary cross-sectional view of one arrangement for joining the ends of forms of the types shown in FIGURES 6 and 7 and showing in dotted lines the position of the form when not inflated.

These ends may be joined in any one of a number of different manners, but FIGURE 8 shows a preferred embodiment. In FIGURE 8 one end 40 of the tube 35 is telescoped inwardly into the inside of the other end of tube 41. A split expanding ring 42 is inserted into the end of the tube end 40 and is allowed to expand outwardly to press the outer surface of the end 40 against the inner surface of the end 41. The split ring 42 has a plurality of needles 43 on the outer surface which extend through the end 40 into the end 41 to thus lock the ends 40, 41 together and prevent them from pulling apart. Obviously, the ring 42 could be made solid and an external clamping ring employed. A flexible, expandible tube could also be used in place of ring 42.

In some instances the ring 42 may be omitted and the hydraulic pressure on the inside of the end 40 used to force this end into frictional engagement with the inside of the end 41 and thus preventing the ends from pulling apart. Such latter arrangement would be useable where the form is employed in a position where its maximum outside diameter is determined by an outer restraining member such as a metallic ring or hoop or by the walls of a shaft (see FIGURE 16) where the form is being used.

Figure 7:
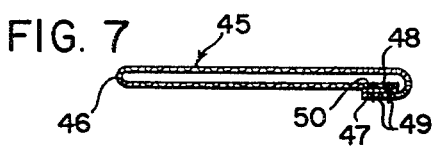
FIGURE 7 is a view similar to FIGURE 4 but showing a still further alternative mode of construction of the form.

FIGURE 7 shows an alternative arrangement for manufacturing the tube wherein an elongated strip of flexible material 45 is folded on itself as at 46 with one end 47 overlapping the other end 48 and these two overlapping ends are stitched as at 49 and cemented as at 50. Again it is to be noted that the inner surface of end 47 faces the outer surface of end 48. The cement is thus in shear.

Figure 9:
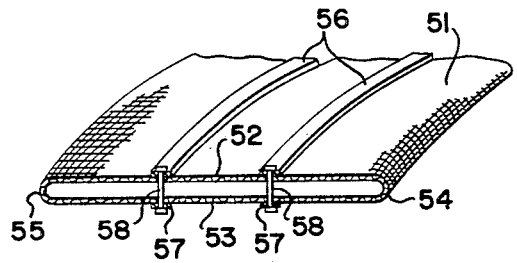
FIGURE 9 is a fragmentary cross-sectional view of an alternative type of form usable in conjunction with forms of the type shown in FIGURE 1.
Figure 10:
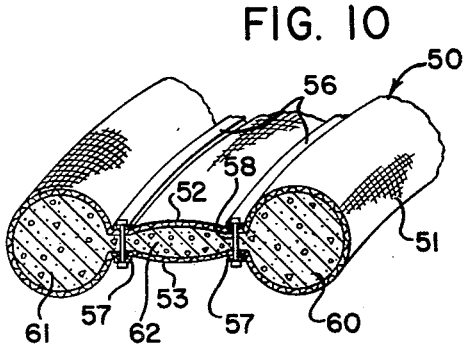
FIGURE 10 is a fragmentary cross-sectional view of the form of FIGURE 9 inflated with cement.

FIGURES 9 and 10 show an alternative arrangement of a form 50 constructed in accordance with the present invention. In this embodiment a tube 51 is flattened into upper and lower sidewalls 52, 53 and means are provided tying the two walls 52, 53 together at points spaced from the inner and outer edges 54, 55 respectively. In the embodiment shown, the upper and lower edges 52, 53 are held together along a line spaced from the inner edge 54 and along a line 57 spaced inwardly from the outer edge 55 by means of pairs of rings 56, 57, one pair on the top and the other on the bottom, held in spaced relationship by tension members 58. Obviously, more rings may be employed or a single ring may be employed midway between the edges 54, 55 or unequally spaced therefrom as desired. The tension members 58 are preferably metal. A series of wire or rope loops can be employed. Wire is preferred because of its higher tensile strength.

FIGURE 10 shows the form 50 of FIGURE 9 when it is inflated. In effect, this form is comprised of inner and outer toroids 60, 61 integrally joined by a midsection 62 which in the embodiment shown has a slight bulging surface and if this slight bulge is undesirable, then further means can be provided tying the two sides 52, 53 together.

Figure 15:
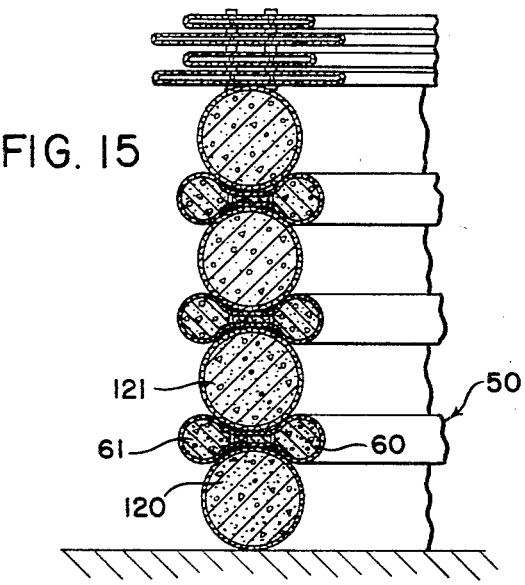
FIGURE 15 is a fragmentary cross-sectional view of a stack of forms, part of them inflated, showing an alternative arrangement for horizontally interlocking the forms.

The radial spacing of the two toroids 60, 61 may be as desired but in the preferred embodiment are so spaced that they will tangentially engage a single toroid as shown in FIGURE 15.

Figure 11:
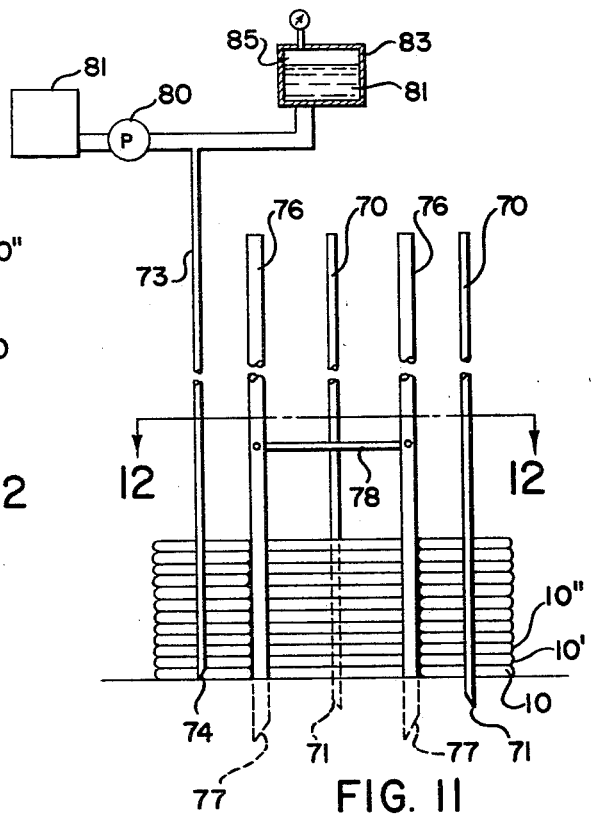
FIGURE 11 is a side cross-sectional view of a plurality of forms in position prior to being inflated.
Figure 13:
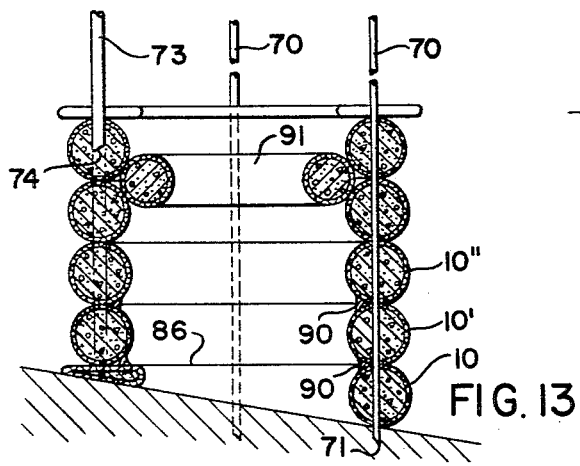
FIGURE 13 is a view similar to FIGURE 11 showing a portion of the forms inflated and further showing an embodiment of the invention employed when the surface on which the cement bodies are to be erected is not horizontal.

FIGURES 11 and 13 show one mode of employing the toroid forms of FIGURES 1–8 to form a vertically extending cylinder of concrete which cylinder can obviously by located on either the earth's surface or on the bottom of a lake, river or sea.

Figure 12:
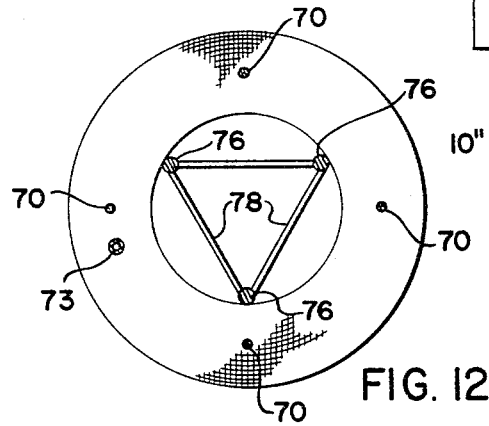
FIGURE 12 is a top cross-sectional view of FIGURE 11 taken approximately on the line 12—12 thereof.

In carrying out the method illustrated in FIGURE 11, a plurality of forms 10, 10', 10" etc. in collapsed condition are stacked one on top of the other so that their centers and inner and outer edges are in vertical alignment. A plurality of guide rods 70, each having a pointed end 71, are then pushed verticaly downwardly through all of the forms 10. In pushing the guide rods 70 downwardly, care should be taken so as not to break any of the strands of the fabric. The strands of the fabric are relatively loosely woven and the rods 70 may be pushed through the fabric simply by working the rods to force the strands aside. One or a plurality of guide rods 70 may be employed, four being shown in FIGURE 12.

In the same manner, a grout pipe 73 having a lower pointed end 74 is pushed vertically downwardly through the walls of all the forms 10, this operation being done by simply pushing the strands of the fabric aside to make room for the grout rod 73. Any number of forms 10 may be assembled in this manner and this assembly may take place at the point where the cement cylinder is to be located or may take place in a factory.

To accurately locate the cylinder a plurality of guide posts 76 having lower pointed ends 77 are inserted into the ground. These guide posts 76 are so spaced as to define a circle generally equal to the diameter of the circle formed by the inner edges of the forms 10 in the collapsed condition.

Alternatively, these guide posts 76 can be forced radially outwardly against the collapsed inner edges of the forms 10 so as to define a circle corresponding to the diameter of the forms in the inflated condition, which diameter obviously is somewhat greater than the diameter in the collapsed state. Bracing struts 78 are placed between the guide posts 76. Any number of guide posts 76 may be employed, but normally at least three will be employed because such three, when equally spaced, define a circle.

Once the forms 10 and guide rods 70 and/or guide posts 76 have been positioned, the upper end of the grout rod 73 which has its lower end 74 located in the lower form 10, is connected to a grout pump 80 in turn connected to a grout mixer 81. Grout mixed to the above specification is preferred. This grout is then pumped downwardly through the grout rod 73 into the lower form 10.

The lower form 10 first fills with grout and thereafter begins to expand. As it expands, it pushes the forms 10 above it upwardly on the guide rods 70 and along the grout rod 73. It should be pointed out that at this time a downward force on the grout rod 73 should be exerted sufficient to resist the upward forces created by the hydraulic pressure on the lower end of the grout rod 73.

The lower form 10 may be inflated to its maximum and then the grout continued to be pumped until the desired pressure on the grout on the inside of the lower form 10 is reached. In calculating the pressures on the inside of the form 10, the hydrostatic head in the vertical length of the grout in the grout rod 73 must be taken into account. The pressure is allowed to remain on the lower form 10 until the filter bed forms and at least 10% of the water in the grout has bled through this filter bed through the porous walls of the form into the opening where it can be drained away. The pressure is allowed to remain on the lower form 10 until the cement has at least commenced to set up. Normally this will be from 10–15 minutes. The pump 80 may be allowed to continue operating to maintain this pressure or a closed pressure tank 83 partly filled with grout 84 and partly with air 85 may be employed to maintain the pressure even though the pump 80 is stopped. It is to be noted that normally the filter bed packs up so tightly that with the elasticity of the nylon fabric, the pressure will be maintained for time periods in excess of one-half hour without operation of the pump 80.

In the event that the water bottom or earth's surface where the cylindrical cement body is to be erected has an inclination, then in accordance with the invention, the lowermost form 10 is only partly inflated so that the liquid grout in seeking its level under the force of gravity only forces the upper surface 86 of the lower form 10 into a horizontal position, it being noted from FIGURE 13 that the right hand end of the form may be fully inflated while the left hand side of the form is only partially inflated. Using this arrangement, little if any water of the grout will be forced outwardly through the pores of the lower form 10 so that a reduction of water to cement ratio is not obtained. Thus the setting up of the grout in this lower form 10 will not be as fast as would be the case if the water-cement ratio were increased in accordance with the invention. In such instances the invention contemplates pumping a grout into the lower form 10 having a water-cement ratio lower than 0.45 or containing accelerators for accelerating the rate of cement setting up.

Once an upper surface 86 which is level has been established, thereafter the upper forms 10 may be progressively inflated.

In order to do this, it is simply necessary to retract the grout pipe 73 until its open lower end is in the immediate above form 10' and continue the pumping operation until such time as this form 10' is fully inflated and at least 10% of the water in the grout has passed through the filter bed and the walls of the form to decrease the water-cement ratio in this form. As the grout pipe is withdrawn through the lower wall of this form, the strands which are resilient at least partially close the opening. As the form inflates, these strands are pulled tight and close up enough that the grout particles will block any opening remaining.

As soon as the cement in this form has set up, the grout pipe 73 is again retracted so as to be in the next above form 10'' and the process is repeated. As each form 10 is inflated, the forms thereabove are pushed upwardly on their guide rods 70 and along the grout pipes 73, these guide rods 70 and/or the guide posts 76 all serving to maintain the inflated toroids in accurate vertical alignment so that the completed structure will be a vertically extending cylinder.

If desired, the crevasses between adjacent toroids may be filled with a filler material 90 or with smaller toroids 91 or both. Also a beehive shape may be constructed by making each toroidal form successively smaller from the bottom up by an amount not greater than the cross-sectional diameter D of the toroid.

Figure 14:
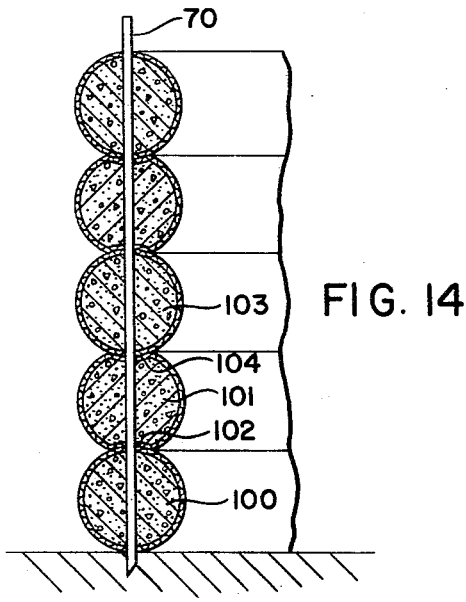
FIGURE 14 is a fragmentary cross-sectional view of FIGURE 13 but showing an alternative arrangement for inflating the forms wherein the forms are horizontally interlocked.

Each toroid of FIGURE 13 has a tangential engagement with its immediate adjacent toroid. Except for the existence of the guide rods 70, each toroid could readily slip relative to its immediate adjacent toroid. FIGURE 14 shows an arrangement of inflating the form 10 whereby the torioids will be self-aligning. In this embodiment of the invention, the lowermost form 100 is inflated to the maximum pressure. The next immediate form 101, however, is only partially inflated so that its lower surface can conform to the upper surface of the lower toroid 100 and instead of having a tangential engagement, a considerable arc 102 of the lower surface of the toroid 101 will engage the upper surface of the toroid 100. Thereafter, the third toroid 103 from the bottom is inflated to the maximum. Again its lower surface will compress the next lower toroid 101 so as to engage it with a considerable arc 104. This process may be repeated until the cylindrical member is completely formed.

FIGURE 15 shows an alternative arrangement for making the toroids self-interlocking. In this embodiment of the invention the lower form 120 is inflated to the maximum. Thereafter a form of the type illustrated in FIGURES 9 and 10 is positioned on top of the form 120 and it is inflated. In this instance the inner toroid 60 has a lesser internal diameter than the internal diameter of the toroid 120 while the outer toroid 61 has an outer diameter greater than that of the lower toroid 120. In effect, the form 50 forms a saddle which rests on top of the upper surface of the lower form 120. Thereafter, a second toroidal form 121 is positioned on top of the form 50 and is fully inflated. This process may continue until all of the forms have been completely inflated. Using the method of FIGURE 15, all of the forms can be fully inflated whereas in FIGURE 14 only every other form is inflated fully. Obviously wooden or metal saddles could be placed between adjacent toroids.

Figure 16:
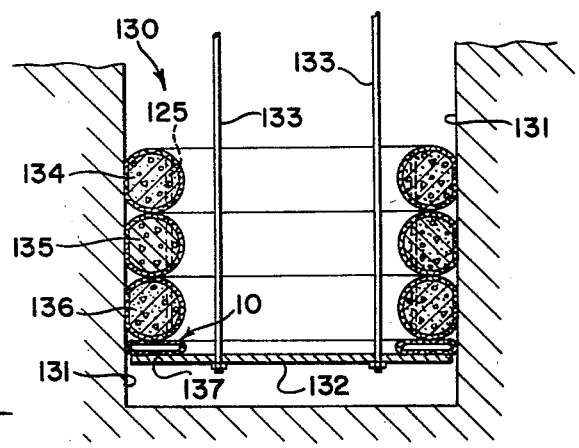
FIGURE 16 is a cross-sectional view of a shaft showing the application of the invention to lining the shaft with cement.

FIGURE 16 shows the application of the invention to the lining of a vertical shaft 130 which shaft is defined by a cylindrical sidewall 131. The shaft 130 can be dug by any suitable means which form no part of the present invention. After the shaft has been partly or completely dug, a form 134 having an outer diameter of the shaft 130 is positioned in the shaft and supported there by any suitable means such as a platform 132 suspended by cables 133. The first form placed, 134, is then inflated as above described and pressure held on the form 134 until at least 10% of the water in the grout has bled through the filter bed and the porous walls of the form 134, and until the cement has at least commenced to set up. Thereafter, a second form 135 is positioned immediately below the form 134 and is likewise inflated. This process is then continued by filling form 136 and then form 137 and so on until the entire inner surface of the shaft 130 has been lined with toroids of cement.

It is to be noted that using this embodiment of the invention it is possible to compact the walls 131 of the shaft 130 by the radial outward expansion of the forms with the grout under pressure therein.

It is also to be noted that in some instances the inner surface of each toroid, particularly if the form is made from a straight tube, may be wrinkled but this normally is not objectionable. If it is objectionable, the entire inner surface can be then coated with a mortar or plaster. Also the radially inner surface of the toroid can be made liquid impermeable to prevent the forming of the filter bed on this inner surface.

Figure 17:
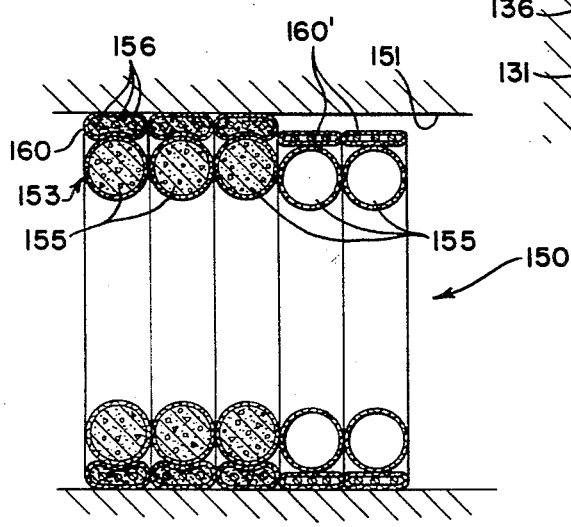
FIGURE 17 is a fragmentary cross-sectional view of a horizontal tunnel showing the applications of the invention for lining the walls of the tunnel with a prestressed lining.

FIGURE 17 shows an arrangement for employing the present invention particularly adapted for the lining of shafts or tunnels 150 defined by cylindrical sidewalls 151 in the earth's surface particularly intended for carrying water under pressure wherein the pressures are high enough that special means must be provided for resisting the expansive force of this water under pressure. In this embodiment of the invention, the tunnel 150 is first provided with a rigid liner indicated generally at 153 having an outer diameter substantially less than the diameter of the tunnel 150. This liner may be concrete formed in conventional forms but in the embodiment shown, is comprised of a plurality of toroidally shaped concrete bodies 155 formed as above described.

In the space between the outer surface of the toroidal bodies 155 and the tunnel surface 151 are located a plurality of forms 160 having inflated outer diameters greater than the diameter of the shaft 150 and inner diameters greater than the outer diameters of the bodies 155. These toroid forms 160 may have a plurality of reinforcing tensile hoops 156 for assisting the cement in the toroid 160 to resist tension forces. On the right hand side of the drawing the forms 160' are shown in the uninflated state. These forms 160' are inflated as above described so as to exert both a radial outward force against the wall 151 and a radially inner force on the concrete bodies 155. The result is that the cement in the bodies 155 is in a state of compression while the reinforcing members 156 are in a state of tension, in effect, the inner wall lining the shaft 150 is in a prestressed compression state. It is thus better able to withstand the outward hydraulic pressures of water later to be flowing through the tunnel 150. The toroids 160 can have an outer inflated diameter less than the shaft diameter and the space remaining after inflation can be filled by a post grouting operation.

On the right hand side of FIGURE 17 the two toroids 155 are shown as being out of alignment with the other three. Obviously as the uninflated forms 160' are inflated, this will force these toroids 155 into alignment with the other toroids.

Figure 18:
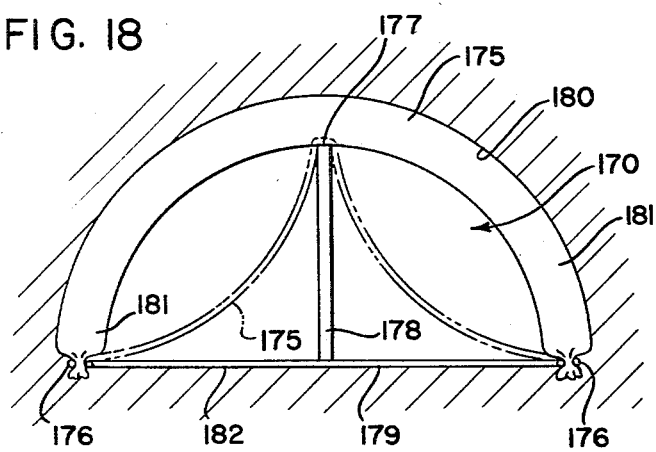
FIGURE 18 is a cross-sectional view of a semicircular tunnel showing the application of the invention to lining of such a tunnel, the dashed lines showing the form prior to inflation.

FIGURE 18 shows a method of using the present invention to line the walls of a semicircular tunnel 170. In this embodiment of the invention the form 175 is in the shape of a segment of a toroid and its ends are tied off by any suitable means as at 176. The center 177 of the form 175 is supported so as to be close to the upper surface of the shaft 170 by means of a brace 178 resting on the floor 179 of the shaft 170. An air inflatable tube could also be used as such a support. Thereafter the form 175 is inflated as above described with the result that the form expands outwardly into the shape of a semi-toroid firmly engaging the arcuate walls 180 of the shaft 170.

In the event that the lower ends 181 of the semi-toroid are radially unsupported, a tension member 182 suitably fastened to the lower ends 181 can extend therebetween. It is also possible to use a straight tube of a length approximating that of the semi-cylindrical arc. As it is inflated it will assume the shape of a semi-toroid with its inner surface being wrinkled.

Figure 19:
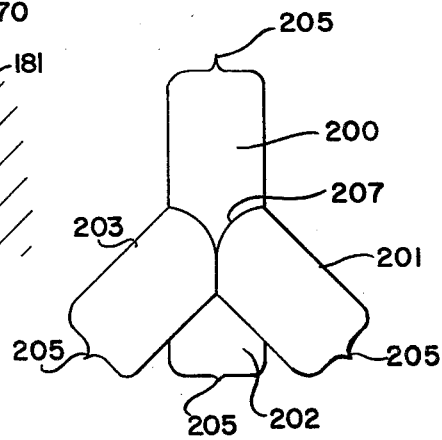
FIGURES 19 and 20 show an embodiment of the invention for making tetrahedrons.
Figure 20:
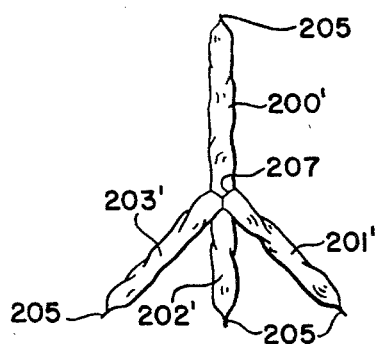

FIGURE 19 shows the application of the invention to the manufacture of concrete bodies other than circular or in a toroidal shape, namely, in the shape of a tetrahedron. A tetrahedron by definition consists of a body having four legs 200, 201, 202, 203 extending outwardly from a common point so as to all be equiangularly spaced from the adjacent legs. Such bodies when manufactured from cement are often used either fully submerged or partly submerged along the shores of large bodies of water to break up the wave action and prevent erosion of the shores. The tetrahedron shape is adopted so that the water currents may flow around and between each of the legs and so that the body always presents the same surfaces to the water regardless of which legs rest on the bottom. Thus in accordance with the invention, a form is constructed from four tubes of porous material 200', 201', 202' and 203' with one end of each tube suitably fastened together as by stitching and cementing along seams 207 so that when the forms are inflated, they will assume the shape of a tetrahedron. The other end of the tubes are then closed by a tie or clamp as at 205. FIGURE 18 shows the general shape that the form will take when inflated and also the body which will be formed by this shape or form.

In use the form is carried to the place where it is intended to ultimately rest. It is allowed to sink and grout as above described is pumped thereinto until such time as at least 10% of the water of the grout has passed through the filter bed forms and the porous walls of the forms. The pressure is maintained until the grout has set. Thereafter, the grout pipe may be removed and subsequent tetrahedrons inflated adjacent thereto.

It will be appreciated that heretofore such tetrahedrons were manufactured at one place and carried to the point of ultimate use and dropped in place by means of large derricks or cranes. The present method avoids the use of such large derricks or cranes and the handling of large bulky and heavy bodies of hardened concrete.

Figure 21:
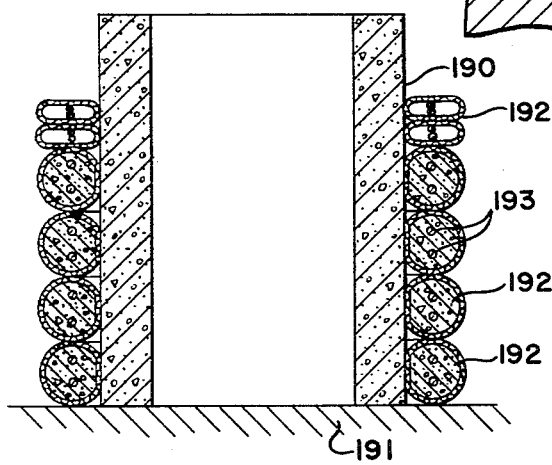
FIGURE 21 shows an embodiment of the invention for inwardly prestressing cylindrical tanks or pipes.

Referring now to FIGURE 13, it will be appreciated that at times it is considered undesirable to have the water passing through some portion of the toroid or it is desirable to have a waterproof wall. In such event, a portion of the fabric forming the toroid may be coated with a liquid impermeable material 87 such as rubber vinyl or neoprene to prevent such passage of water. Obviously, this liquid impermeable material may be placed on either simultaneously or sequentially. In the preferred FIGURE 21 shows an embodiment of the invention for reinforcing the walls of a cylindrical tank or a pipe. In this embodiment there is shown somewhat schematically a cylindrical concrete shell 190 having a vertical axis and resting on the ground 191 upon suitable foundations not shown. It will be appreciated that the shell 190 could also extend horizontally. A plurality of forms 192 having of a toroid when inflated are then positioned around the outside of this shell 190. These forms have a diameter when inflated greater than the diameter of the shell 190. These forms also contain a plurality of steel reinforcing members 193.

In practicing the invention, the forms 192 are inflated progressively in order from the bottom up or from the top down as may be desired. Each form as it reaches its inflation pressure exerts a radially inward force on the shell 190 which in turn is converted to a circumferential compressive stress in the shell 190. Thus, when pressures are subsequently introduced into the inside of the shell 190, pressing radially outwardly, the shell must first pass from its circumferential compressed state into a circumferential tension state and the toroidal concrete bodies with their reinforcing elements 193 around the outside thereof resist this outward radial pressure.

Figure 22:
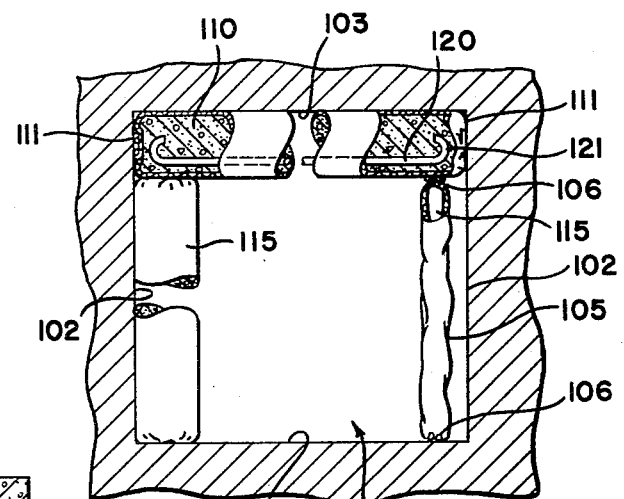
FIGURE 22 shows an embodiment of the invention for supporting the roofs of horizontally extending shafts or tunnels.

FIGURE 22 shows a still further embodiment of the invention for the lining of the walls of horizontally extending shafts or tunnels and for supporting the roofs thereof. In this embodiment the shaft 100 has a floor 101, vertically extending sidewalls 102 and a roof or ceiling 103. The forms are a simple, elongated tube of flexible porous material having the ends tied tight by means of a suitable tie 106.

In FIGURE 22 the form 105 against the right hand wall is shown in the uninflated state while the form 110 and 115 against the left hand wall and the roof respectively are shown in the inflated state. To line the shaft 100 using the present invention, the forms 105, 110 and 115 are placed in position against the side walls and roof and held there by any suitable means (not shown) and are then inflated in accordance with the invention either simultaneously or sequentially. In the preferred embodiment, the roof form 110 is inflated first. It has a length generally just greater than the horizontal spacing of the side walls 102 so that when it is inflated, its ends 111 will engage the side walls 102 with a pressure engagement. This form 110 would thus be self-supporting in this position until the vertically extending forms 105, 115 can be inflated. These forms preferably have a length such that when they are inflated, they will press the form 110 vertically upwardly against the roof 103. The concrete in these forms will be in a state of compression after it hardens.

The form 110 in the preferred embodiment is provided with a reinforcing element 120 of steel or the like extending at least along its lower side, which element 120 has ends reversed as at 121 to firmly lock themselves with the hardened concrete. Obviously, more than one reinforcing element can be employed.

In addition to or as an alternative to the filler material 90 and as a means of providing a smoother inner wall, a collapsible rigid liner may be placed inside of each toroid of FIGURES 16 and 17 before it is inflated having an outer diameter greater than the normal inner diameter so that the inner surface of the toroid when inflated instead of being cylindrical will be flattened as shown by the dotted lines 125 of FIGURE 16.

Where the cylinder of stacked toroids, e.g., of FIGURES 13 and 16, must support substantial vertical loads, the line contact between adjacent toroids may cause high compressive stress concentrations. In such instances the toroids of FIGURE 10 only may be employed with the internal restraining members of steel or rope so spaced and arranged as to provide either a flattened top and bottom surface or with a plurality of cylindrical surfaces in a common plane. Alternatively, rigid removable forms can be provided for restraining the vertical expansion.

It is also to be noted in the construction of the cylinder of stacked toroids that adjacent toroids may have intercommunicating passages so that several toroids can be simultaneously inflated.

The invention has been described in detail with reference to specific embodiments and will be appreciated that modifications and alterations will occur to others upon a reading and understanding of this specification and it is my intention to include all such modifications insofar as they come within the scope of the appended claims or the equivalent thereof.

Having thus described my invention, I claim:

1. A method of forming a concrete body in situ comprising the steps of providing a flexible porous bag of high strength and pumping thereinto a cementitious slurry having a water-cement ratio in excess of 0.45, continuing such pumping until the bag is fully inflated and the particles in the slurry block up the pores in the material, and continuing such pumping until a filter bed is formed and at least 10% of the water has passed through the porous material and thereafter allowing the slurry to harden.

2. A method of manufacturing a cylindrical, concrete body comprising the steps of providing a plurality of forms from a flexible porous high strength fabric, such forms having when inflated generally the shape of a circular toroid, placing such forms in stacked relationship and pumping a cementitious slurry having a water-cement ratio in excess of 0.45 into each of said forms and continuing the pumping until at least some of the forms are fully inflated and the water-cement ratio for at least a substantial thickness in the fully inflated forms is be- 3. The method of claim 2 wherein the surface on which all the forms are supported has an inclination and the lowermost form is only partially inflated so that its upper surface is horizontal notwithstanding the inclination of the surface on which it is supported.

4. The method of claim 2 wherein alternate forms are fully inflated and the intervening forms are only partially inflated whereby all of the forms when they harden interlock in a horizontal direction.

5. The method of claim 2 wherein all of the forms are fully inflated and a plurality of second forms of an outer diameter less than that of the first form are provided and each such form is inflated so as to be generally tangential to the inner surfaces of two adjacent forms.

6. The method of claim 2 wherein all of the forms are fully inflated and a plurality of second forms are provided each having an inner diameter greater than the outer diameter of the main forms and each such form is inflated so as to be generally tangential to the surfaces of two adjacent forms.

7. The method of claim 2 wherein between each pair of first forms, a dumbell shaped toroidal form is positioned having inner and outer bulbous portions which lock the toroidal forms against lateral movement.

8. The method of lining a cylindrical shaft of a predetermined diameter comprising the steps of providing a plurality of forms of flexible porous material having the shape of a toroid when inflated and an outer diameter when inflated greater than the diameter of the shaft, placing such forms in said shaft with the axis of the shaft and toroid being generally aligned and pumping a cementitious slurry into such forms to inflate same.

9. The method of claim 8 wherein a slurry having a water-cement ratio in excess of 0.45 is pumped into such form and the pumping is continued until a pressure is built up and the pressure is maintained until at least 10% of the water in the slurry has passed through the walls of the form.

10. The method of claim 8 wherein the forms are inflated progressively along the inside of the shaft.

11. The method of prestressing a cylindrical, rigid member so as to have circumferential compression forces therein, such member having a predetermined outer diameter comprising the steps of providing a plurality of flexible porous forms in the shape of a toroid when inflated and having an inner radial diameter when inflated less than the radial diameter of the cylindrical member, pumping into such form a cementitious slurry until the form is inflated and a pressure has built up.

12. The method of claim 11 wherein the water-cement ratio of the slurry is in excess of 0.45 and the pressure is maintained until at least 10% of the water has passed through the walls of the form.

13. The method of claim 11 wherein said forms have tensile reinforcing members therein.

14. The method of forming a concrete body comprising the steps of providing a flexible porous bag of woven fabric material, inserting a tube through the wall of such form by moving the strands of such form aside and pumping a cementitious slurry into the inside of such form until an internal pressure is developed while constantly maintaining a longitudinal force on such tube toward said form at least equal to the cross-sectional area of said tube multiplied by the pressure, maintaining the tube in the form until the slurry is no longer readily flowable and thereafter removing the tube from between the strands of the form and allowing the slurry to harden.

15. The method of forming a concrete body comprising the steps of providing a closed, flexible porous bag of woven high strength material, pumping into the inside of such bag a cementitious slurry until the bag is fully inflated and a filter bed forms around the inner surface of such bag, continuing the pumping of such slurry until at least 10% of the water has passed through the filter bed in said bag, and thereafter allowing the slurry to harden.

16. The method of forming a concrete body comprising the steps of providing a flexible, porous bag of high strength woven material, said material being liquid-permeable, pumping into said bag a cementitious slurry having a water-cement ratio in excess of 0.45 and continuing the pumping until a pressure is built up on the inside of the bag and enough water has passed through the liquid-permeable surfaces so that the water-cement ratio for a substantial thickness on the inside thereof is between 0.25 and 0.40.

17. The method of forming concrete bodies under water comprising the steps of providing a flexible porous bag of woven fabric material, submerging such bag below the surface of a body of water and pumping into said bag a cementitious slurry having a water-cement ratio in excess of 0.45, continuing the pumping until a pressure builds up and enough water from the cementitious slurry passes through the surfaces of the bag to reduce the water-cement ratio to 0.40 to 0.25.

18. The method of lining a generally semi-circular tunnel having an arcuate roof comprising the steps of providing an elongated tube of flexible porous material having a length equal to the arc of the roof, positioning such tube in engagement with a plurality of points on the circumference of the roof and pumping into such tube a cementitious slurry to inflate the tube and continuing the pumping until a substantial pressure has been reached and the tube is in firm engagement with said roof.

19. The method of claim 2 including the additional step of placing on the inside of the toroids before inflation a rigid, cylindrical member having an outer diameter greater than the normal inflated radius of the inside of the toroid but less than the mean radius of such toroid whereby the inner surface of the toroid when inflated is generally flattened.

20. The method of lining a tunnel having generally flat side walls and a flat roof with hardened concrete comprising the steps of placing in engagement with the ceiling an elongated collapsed, cylindrical form with closed ends of flexible porous fabric, placing against one side wall a second form and against the other side wall a third form of similar construction, said second and third forms being in the vertical plane of said first form and pumping into said forms a cementitious slurry having a water-cement ratio in excess of 0.45 and continuing the pumping until a pressure builds up in all of said forms and enough water from the cementitious slurry passes through the surfaces of the forms to reduce the water-cement ratio in said forms.

21. The method of claim 20 wherein the length of said first form is approximately equal to the spacing between the side walls and the length of the second and third forms is such as to press the inflated first form upwardly against the ceiling.

22. The method of claim 1 wherein means are provided internally of the toroid cross section for limiting the inflation in a direction parallel to the toroidal axis of revolution.

References Cited

UNITED STATES PATENTS

| | | | |
|---|---|---|---|
| Re. 25,614 | 7/1964 | Turzillo | 264—31 |
| 1,421,857 | 7/1922 | Store | 264—31 |
| 3,234,741 | 2/1966 | Ionides | 52—2 X |

DAVID J. WILLIAMOWSKY, *Primary Examiner.*

PETER M. CAUN, *Assistant Examiner.*